United States Patent

[11] 3,561,576

[72] Inventor Gilbert F. Lutz
 Chesterland, Ohio
[21] Appl. No. 793,289
[22] Filed Jan. 23, 1969
[45] Patented Feb. 9, 1971
[73] Assignee The Warner & Swasey Company
 Cleveland, Ohio
 a corporation of Ohio

[54] MACHINE TOOL DRIVE
 23 Claims, 7 Drawing Figs.
[52] U.S. Cl................................................ 192/56,
 82/21; 192/79, 192/94, 192/150
[51] Int. Cl.................................................F16d 43/20,
 B23b 21/00
[50] Field of Search......................................... 192/481,
 56, 56(L), 79, 94, 150; 82/21

[56] References Cited
 UNITED STATES PATENTS
2,723,686 11/1955 Darash........................ 192/150(X)
2,778,468 1/1957 Babaian....................... 192/56
2,978,965 4/1961 Armitage et al............. 192/150(X)
3,120,133 2/1964 Diener et al.................. 192/150(X)
3,300,013 1/1967 Fisher........................... 192/150

FOREIGN PATENTS
321,702 11/1929 Great Britain................ 192/56(L)

Primary Examiner—Allan D. Herrmann
Attorney—Yount, Flynn & Tarolli

ABSTRACT: An improved machine tool assembly includes cross-slide and turret assemblies for supporting tools which operate on a workpiece mounted on a spindle assembly. These assemblies are driven in a predetermined working relationship by a common drive train. The drive train includes improved clutch assemblies which are disengaged in response to overloading of the cross-slide or turret assembly, respectively. To ensure that the desired operation is performed on the workpiece after disengagement of the clutch assembly, the clutch assembly can be reengaged only when the previously overloaded assembly is in the predetermined relationship with the other assemblies. To this end, each clutch assembly includes a driving member which is drivingly connected in an initial relationship with a driven member when the clutch assembly is engaged. Upon disengagement, relative angular displacement between the driving and driven members occurs. The clutch cannot be reengaged until the members are restored to their initial predetermined relationship.

INVENTOR.
GILBERT F. LUTZ
BY
Yount, Flynn & Tarolli
ATTORNEYS

INVENTOR.
GILBERT F. LUTZ
BY
Yount, Flynn & Tarolli
ATTORNEYS 3,561,576

MACHINE TOOL DRIVE

The present invention relates generally to an improved machine tool drive and, more particularly, to a clutch assembly which is operable from a disengaged condition to an engaged condition only when the driving and driven members of the clutch assembly are in a predetermined working relationship with each other.

A known machine tool includes a spindle assembly which rotates a workpiece. Cross-slide and turret assemblies are provided for supporting tools which operate on the workpiece as it is rotated by the spindle assembly. A drive train is utilized to drive or effect movement of the cross-slide, turret and spindle assemblies. During a particular machining operation, the spindle, cross-slide and turret assemblies are driven or moved in a predetermined working relationship with each other to effect a desired machining.

The drive trains to the turret assembly and cross-slide assembly each include a clutch which disengages in response to an overloading of its respective assembly. When a clutch is in the disengaged condition, the assembly it drives can be moved relative to the other assemblies. Once the overload condition has been corrected, the clutch assembly is manually reengaged and the machining operations continued.

Heretofore, difficulty has been experienced in reengaging the clutch in such a manner as to resume the predetermined working relationship between the overloaded assembly and the other assemblies. This difficulty results from movement of the overloaded assembly out of the predetermined working relationship with the other assemblies while its clutch is disengaged. If the overloaded assembly is not moved back in to the predetermined working relationship with the other assemblies before reengagement of the clutch, the overloaded assembly will not have the desired working relationship with the other assemblies and subsequent operations of the machine tool will not be properly carried out.

Accordingly, it is an object of this invention to provide a new and improved machine or apparatus having a clutch assembly which disengages upon one operating assembly encountering an overload condition and automatically reengages only when the operating assemblies of the machine are in a predetermined relationship with each other.

Another object of this invention is to provide a new and improved machine or apparatus, in accordance with the next preceding paragraph, wherein the clutch assembly includes biasing means for urging it to an engaged condition when the operating assemblies are in the predetermined relationship with each other.

Still another object of this invention is to provide a new and improved overload release clutch assembly for use in a drive train for a pair of machine tool operating assemblies and which releases the drive to one of the assemblies upon the occurrence of an overload condition experienced thereby, and wherein the clutch assembly is automatically reengaged only when the operating assemblies are in the desired working relationship.

Another object of this invention is to provide a new and improved clutch having driving and driven members with connector means for drivingly connecting these members in an initial angular relationship, the connector means being operable from an engaged condition to a disengaged condition in response to an overload encountered by the driven member and from the disengaged condition to the engaged condition only when the driving and driven members are returned to their initial relative positions in which no relative angular displacement of the members from their initial relationship exists.

Yet another object of the present invention is the provision of a new and improved clutch wherein the driving and driven members are threadedly connected as to cause relative axial movement thereof upon relative angular movement thereof with the relative axial movement thereof misaligning the connector means so that reengagement thereof cannot occur until the driving and driven members return to the relative axial positions they had when disengagement occurred.

These and other objects and features of the present invention will become more apparent upon a consideration of the following description taken in connection with the accompanying drawings wherein.

Figure 2:
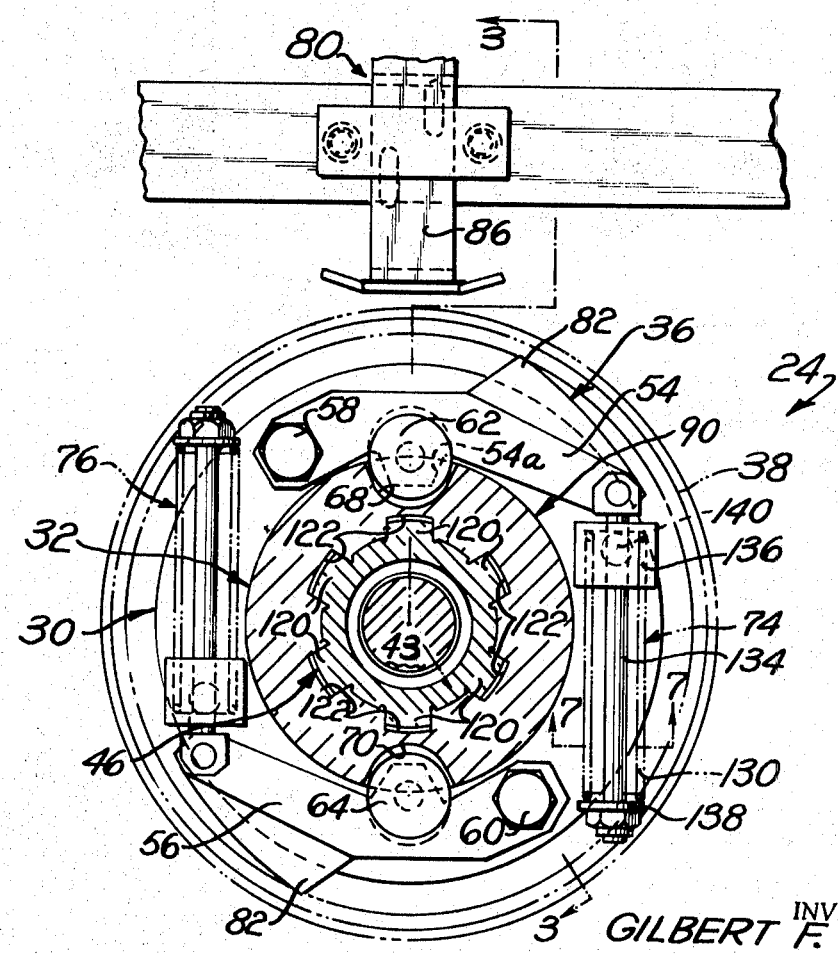
FIG. 2 is a sectional view of a new and improved clutch assembly which is located in a drive train for the machine tool of FIG. 1, the clutch assembly being shown in an engaged condition.
Figure 3:
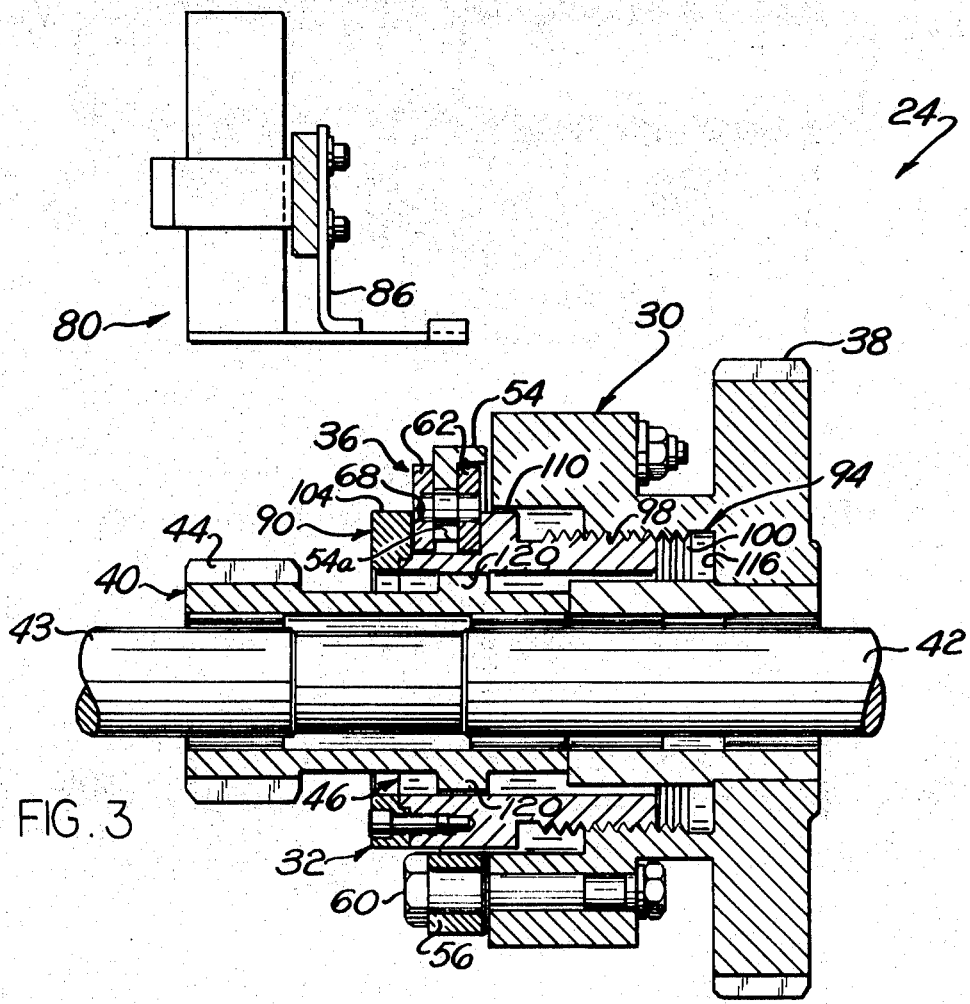
Figure 6:
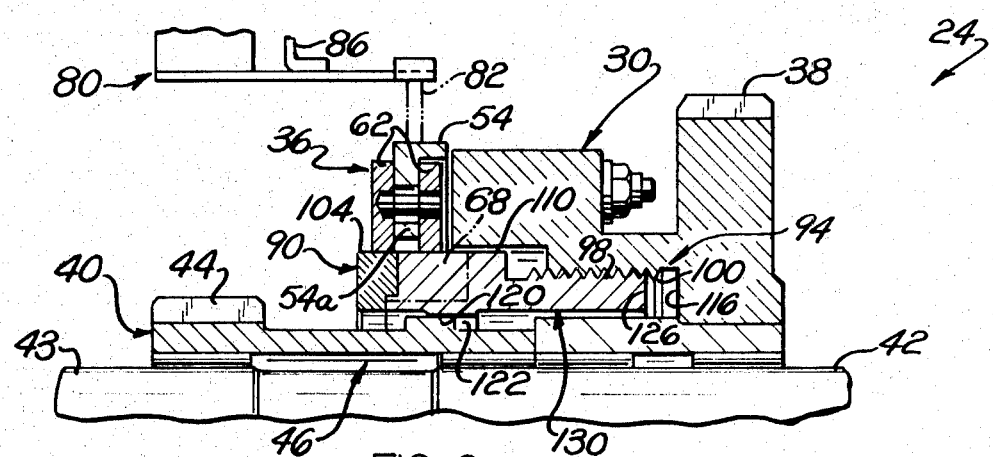
Figure 5:
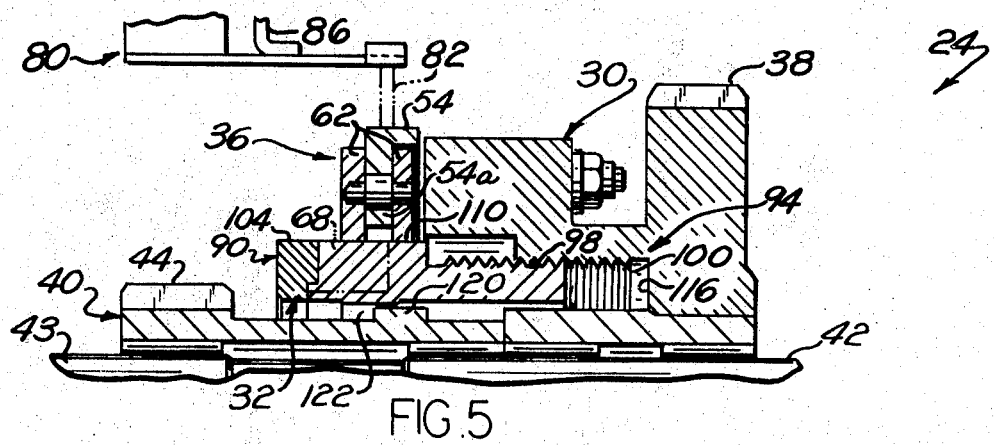
Figure 4:
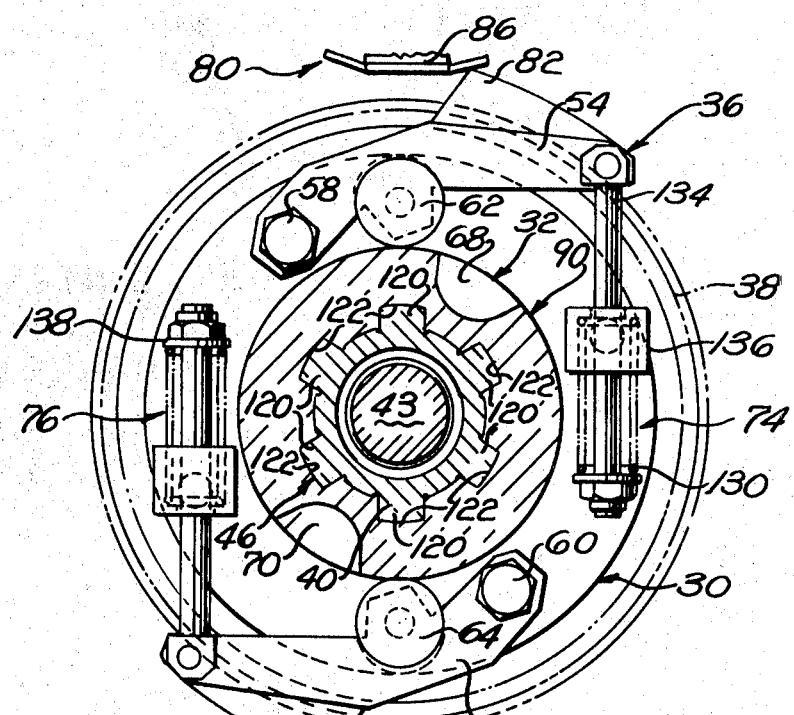
Figure 7:
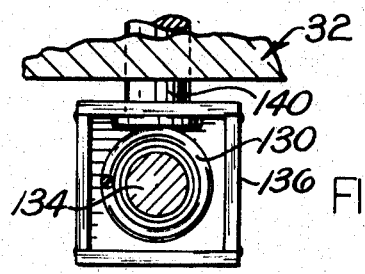

FIG. 0 3 is a sectional view, taken along the line 3–3 of FIG. 2, further illustrating the clutch assembly;

FIG. 4 is a sectional view, similar to FIG. 2, illustrating the clutch assembly in a disengaged condition;

FIG. 5 is a fragmentary sectional view of a portion of the clutch assembly of FIG. 3, the clutch assembly being shown in a disengaged condition to which it was operated by a counterclockwise drive;

FIG. 6 is a fragmentary sectional view, similar to FIG. 5, illustrating the clutch assembly in a disengaged condition to which it was operated by a clockwise drive; and FIG. 7 is a schematic view, taken on an enlarged scale along the line 7–7 of FIG. 2, illustrating the structure of a biasing means for urging the clutch assembly to the engaged condition.

The present invention provides an overload release clutch assembly operable to a disengaged condition in response to an overloading of an operating assembly driven thereby. When the clutch is in the disengaged condition, relative movement can occur between the operating assembly driven by the clutch and another operating assembly in the machine. The occurrence of relative movement between the operating assemblies results in destruction of any predetermined working relationship originally established between the operating assemblies. To provide for restoration of the predetermined working relationship between the operating assemblies after the clutch assembly is reengaged, the clutch assembly can be reengaged only when the operating assemblies are returned to the predetermined working relationship.

Although it is contemplated that the present invention can be utilized in many different types of machines, the drawings illustrate the present invention as embodied in a single spindle-chucking machine tool 12. The machine tool 12 includes a turret assembly 14 and a cross-slide assembly 16 which support tools for operating on a workpiece 18. During the performance of an operation on the workpiece 18, the workpiece is rotated by a spindle assembly 20 while the turret assembly 14 and cross-slide assembly 16 are moved in a predetermined working relationship with the workpiece 18. Of course, during performance of certain operations such as the forming of a single-point thread on the workpiece 18, only the turret assembly 14 need be moved relative to the workpiece and spindle assembly 20.

Figure 1:
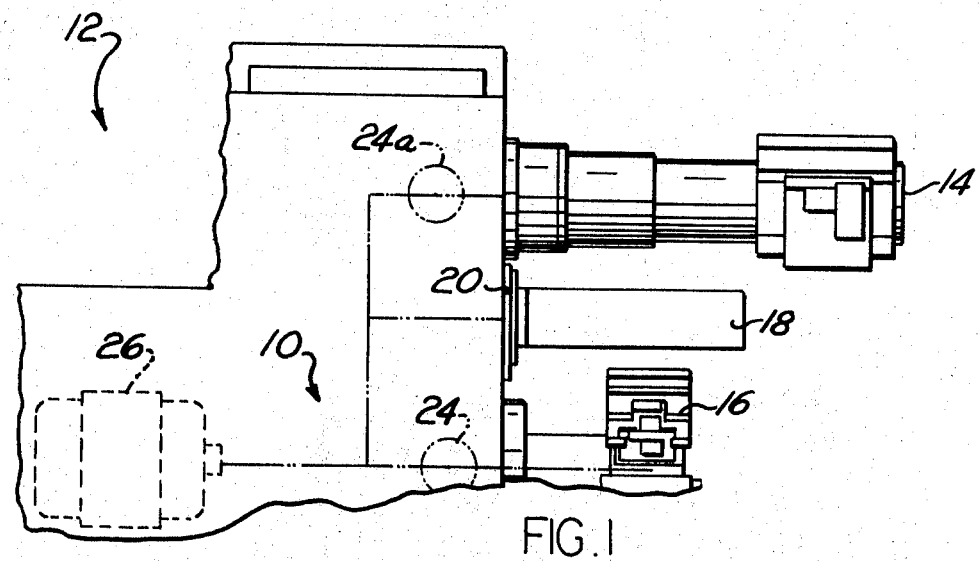
FIG. 1 is a schematic illustration of a machine tool having a drive train constructed in accordance with the present invention.

The machine tool 12 includes a drive train 10, shown schematically in FIG. 1. An overload release clutch assembly 24 is provided in the drive train 10 and is in the drive to the cross-slide 16. When the cross-slide assembly 16 encounters an overload condition, the clutch assembly 24 is operated to a disengaged condition to effectively disconnect the cross-slide assembly 16 from a reversible motor 26. The overload condition encountered by the cross-slide assembly could result from any number of occurrences which prevent or restrict movement of the cross-slide.

The drive train 10 also includes a clutch assembly 24a in the drive to the turret assembly 14. Clutch assembly 24a is in substantially all respects identical to clutch assembly 24. Therefore, a detailed description will be made only of clutch assembly 24.

The clutch assembly 24 includes a rotatable driving member 30 (See FIGS. 2 and 3) which is drivingly connected with a rotatable driven member 32 by a drive-transmitting means or connector assembly 36. The driving member 30 has an input gear portion 38 which is rotated by operation of the motor 26. The input gear portion 38 may be driven in any suitable manner and a description thereof is not necessary herein.

Rotation of the driving member 30 by the gear 38 rotates the driven member 32 through the connector assembly 36. The driven member 32 drives an output coupling member 40 which is rotatably mounted on a support shaft 42. The output coupling member 40 has an output gear portion 44 which connects the clutch assembly 24 in a driving relationship with the cross-slide assembly 16. A plurality of teeth on the output coupling member 40 cooperates with a plurality of grooves on the driven member 32 to form a slidable coupling assembly, as will be explained in more detail subsequently.

During normal operation of the machine 12, the cross-slide assembly 16 is driven in a predetermined working relationship with the turret assembly 14 and spindle assembly 20. This driving relationship of the cross-slide assembly 16 with the turret and spindle assemblies is maintained by the connector assembly 36 when the clutch assembly 24 is in the engaged condition, shown in FIGS. 2 and 3. The connector assembly 36 includes a pair of arms 54 and 56 (FIG. 2) which are pivotally connected at 58 and 60 to the driving member 30. Rollers 62 and 64 are mounted on the arms 54 and 56 and engage the surfaces defining recesses 68 and 70, respectively, formed in the driven member 32. Each arm 54, 56 is associated with the rollers 62, 64, respectively, in identical ways and only arm 54 and the rollers 62 will be described further. The arm 54 has a generally arcuate configuration, as shown in FIG. 2, with a central lug portion 54a projecting therefrom. The rollers 62, as shown in FIG. 3, comprise a pair of rollers located on opposite sides of the lug portion 54a. By this construction, the rollers 62 have a sufficient degree of projection into and contact with the recess 68 to transmit a high degree of torque. The rollers 62, as best shown in FIG. 2, have their centers lying approximately in the arcuate plane of the surface in which e the recess 68 is formed.

A pair of spring assemblies 74 and 76 are provided for biasing the arms 54 and 56 inwardly about the pivot connections 58 and 60 to retain the rollers 62 and 64 in engagement in the recesses 68 and 70. This engagement of the rollers 62 and 64 in the recesses 68 and 70 provides for the transmission of driving forces between the driving member 30 and the driven member 32 without relative rotation therebetween to thereby drive the cross-slide assembly 16 in the desired working relationship with the turret and spindle assemblies.

To protect the cross-slide assembly 16 against damage, the clutch assembly 24 is operated from the engaged condition (See FIG. 2) to a disengaged condition (See FIG. 4) in response to an overloading of the cross-slide assembly 16. Overloading of the cross-slide assembly 16 results in the application of a relatively large load to output gear 44 so that it resists rotation under the influence of drive forces transmitted from the driving member 30 through the connector assembly 36. This resistance to rotation causes the rollers 62 and 64 to be cammed or forced out of the recesses 68 and 70 in the driving member 30. The clutch assembly 24 is then in the disengaged condition and the driving member 30 can be rotated relative to the driven member 32. Of course, when disengaged, the clutch assembly 24 is no longer effective to transmit driving forces from the motor 26 to the cross-slide assembly 16.

Upon operation of the clutch assembly 24 to the disengaged condition of FIG. 4, a switch assembly 80 is actuated to shut down the machine 12 by interrupting an electrical circuit (not shown) for energizing the drive motor 26. In addition, actuating of the switch assembly 80 operates an alarm circuit (not shown) to indicate to an operator of the machine 12 that the cross-slide assembly 16 has been overloaded and that the clutch assembly 24 has been disengaged. Accordingly, a pair of cam portions 82 are provided on the arms 54 and 56 for operating an actuator 86 of the switch assembly 80 when the clutch assembly 24 is in the disengaged condition of FIG. 4. Upon disengagement of the clutch assembly 24, the cam portions 82 are moved outwardly from the position shown in FIG. 2 to the position shown in FIG. 4 to enable the cam portions 82 to engage and move an actuator 86 of the switch assembly 80. This engagement between the actuator assembly 86 and one of the cam portions 82 operates the switch to an open condition to thereby interrupt an electrical circuit for the motor 26 and shut down the machine 12.

It should be noted at this point that, although members 30 and 32 have been referred to as the "driving" and "driven" members, respectively, the roles could easily be reversed. The preferred arrangement is for member 30 to be the driven member when a switch assembly such as switch assembly 80 is used. However, with other switch assemblies, or when no switch assembly is used, it would make no difference which of the two members 30, 32 is driving and which is driven.

As was previously described, upon operation of the clutch assembly 24 to the disengaged condition, the rollers 62 and 64 are cammed or forced out of the recesses 68 and 70 by relative rotation between the driving and driven members 30 and 32 (See FIGS. 4 and 5). The rollers 62 and 64 are then positioned in rolling engagement with a generally cylindrical blocking portion 90 of the driving member 30. The driving and driven members 30 and 32 are then rotatable relative to each other to enable the cross-slide assembly 16 to be moved relative to the turret and spindle assemblies and workpiece 18 to facilitate correction of the condition causing the overload on the cross-slide assembly.

Upon reengagement of the clutch assembly 24 after correction of an overload condition on the cross-slide assembly 16, the previously interrupted work operation is resumed. To provide for a satisfactory continuation of the work operation, the cross-slide assembly 16 must be returned to the same predetermined working relationship with the spindle assembly 20 and turret assembly 14 as existed prior to the clutch assembly 24 being disengaged. Therefore, the clutch assembly 24 must be reengaged only when the assemblies are restored to the predetermined working relationship. For example, if the clutch assembly 24 was reengaged while displaced 180° from the position shown in FIG. 2, that is, with the rollers 64 engaging the recess 68 and the rollers 62 engaging the recess 70, the cross-slide assembly 16 would be displaced from the desired working relationship with a spindle assembly 20 and turret assembly 14. Thus, any effective relative rotation between the driving and driven members must be eliminated before the clutch assembly 24 is reengaged.

To prevent the clutch assembly 24 from being reengaged when there is any angular displacement between the driving and driven members from their initial relationship, the clutch assembly 24 includes a threaded coupling or connector assembly 94. The coupling 94 effects axial movement between the driving and driven members 30 and 32 upon relative rotation or angular displacement of the driving and driven members. This axial movement between the driving and driven members 30 and 32 moves the recesses 68 and 70 out of axial alignment with the rollers 62 and 64. Therefore, upon half a revolution of effective relative rotation or an angular displacement of 180° between the driving and driven members 30 and 32, the rollers 62 are unable to enter the recess 70, since the rollers are not axially aligned with the recess. Similarly, this axial displacement of the driving and driven members 30 and 32 prevents the rollers 62 from entering the recess 68 and the rollers 64 from entering the recess 70 to reengage the clutch assembly 24 after one or more full or partial revolutions of effective relative rotation between the driving and driven members. It should be apparent that, since two rollers are associated with each arm 54, 56, on opposite sides of a central lug portion, one roller will engage.

To provide for this axial movement between the driving and driven members 30 and 32, the coupling 94 includes a set of outer or exterior threads 98 on the driven member 32 which engage a set of interior threads 100 on the driving member 30. Relative rotation between the driving and driven members 30 and 32 cause the threads 98 and 100 to effect axial movement of the driven member relative to the driving member. This moves the recesses 68 and 70 axially relative to the rollers 62 and 64 which then engage a blocking portion 90 of the driving member 30. Therefore, the rollers 62 and 64 cannot enter the recesses 68 and 70 as long as the driving and driven members 30 and 32 are angularly displaced from the initial condition by effective relative rotation between the driving and driven members.

From the foregoing description, it can be seen that when the cross-slide assembly is overloaded, the rollers 62 and 64 are cammed or forced out of the recesses 68 and 70 against the influence of the spring assemblies 74 and 76. This permits the driving member 30 to continue to rotate, now effectively uncoupled from the overloaded cross-slide assembly 16. Assuming a counterclockwise drive (as viewed in FIG. 2), and assuming that the cross-slide assembly 16 jams with the driven member 32 in the position shown in FIG. 4, continued rotation of the driving member cams the rollers 62 and 64 out of the recesses 68 and 70. The rollers then engage the blocking portion 90 to hold the arms 54 and 56 in a radially extended position, as shown in FIG. 4. In this position, rotation of driving member 30 results in the switch assembly 80 being actuated by the cam portions 82 of arms 54 and 56 to stop the motor 26.

Moreover, after disengagement of the clutch assembly 24, the driving member 30 is rotated in a counterclockwise direction relative to the driven member 32. This relative rotation causes the threaded coupling 94 to move the driven member 32 axially inwardly from the position shown in FIG. 3 to the position shown in FIG. 6. This axial movement of the driven member 32 relative to the driving member 30 moves the recess 68 (indicated in dashed lines in FIG. 6) out of axial alignment with the rollers 62. The rollers 62 then roll along an outer annular surface 104 formed on the blocking portion 90 (See FIGS. 3 and 5). Of course, the rollers 64 are also moved out of axial alignment with the recess 70 and engage the annular blocking surface 104.

To reengage the clutch assembly 24, it is necessary to reverse the previous relative rotation between the driving and driven members 30 and 32 so that there is substantially zero effective relative rotation between them. This can be accomplished by reversing the direction of operation of the motor 26 and jogging it to effect a clockwise rotation (as viewed in FIG. 4) of the driving member 30. If preferred, the effective relative rotation between the driving and driven members 30 and 32 can be eliminated by manually operating a crank (not shown) to move the cross-slide assembly 16 in a direction to effect counterclockwise (as viewed in FIGS. 2 and 4) rotation of the driven member 32 relative to the driving member 30. This subsequent reversal of the relative rotation between the driving and driven members causes the threaded coupling 94 to reverse the previous axial movement of the driven member 32 relative to the driving member 30. When there is substantially zero angular displacement of the driving member 30 and driven member 32 from their initial condition, the rollers 62 and 64 are again radially and axially aligned with their corresponding recesses 68 and 70. The arms 54 and 56 of the connector assembly 36 are then moved inwardly by the action of the spring assembly 74 and 76 to automatically reengage the clutch assembly 24.

Operation of the clutch assembly 24 to the disengaged condition while the driving member 30 is being rotated in a clockwise direction (as viewed in FIG. 2) by operation of the reversible motor 26, results in clockwise rotation of the driving member 30 relative to the driven member 32. This clockwise relative rotation between the driving and driven members causes the threaded coupling 94 to move the driven member 32 axially outwardly relative to the driving member 30. Thus, the driven member 32 moves axially from the position shown in FIG. 3 to the position shown in FIG. 5. As the driven member 32 moves outwardly relative to the driving member 30 under the influence of the threaded coupling 94, the recess 68 is moved out of axial alignment with the rollers 62. The rollers 62 then engage an inner annular surface 110 of the blocking portion 90 (see FIG. 5). Similarly, the rollers 64 also move out of engagement with the recess 70 and into rolling engagement with the blocking surface 110.

It should be apparent that, since two rollers are mounted on each arm 54, 56, respectively, on opposite sides of a central lug portion, one roller will engage the surface 104 while another roller engages surface 110. In this manner, the axial movement of the driven member 32 can be minimized as compared to a construction utilizing a single roller mounted on one side of the arms.

To reengage the clutch assembly 24, it is necessary to reverse the previous clockwise relative rotation between the driving and driven members. This causes the threaded coupling assembly 94 to move the driving member 30 axially outwardly relative to the driven member 32 to thereby bring the recesses 68 and 70 into radial and axial alignment with the rollers 62 and 64. The spring assemblies 74 and 76 then pull the arms 54 and 56 inwardly to move the rollers 62 and 64 into the recesses 68 and 70 to reengage the clutch assembly 24. Again, it should be noted that the threaded coupling 94 provides for relative axial movement between the driving and driven members 30 and 32 to prevent the clutch assembly from being reengaged when the members are angularly displaced from their initial relationship by effective relative rotation between the members.

After the clutch assembly 24 has been operated to the disengaged condition of FIG. 5, continued rotation of the driving member 30 in the clockwise direction relative to the driven member 32 could result in the threads 98 of the threaded coupling 94 being disengaged from the threads 100. Similarly, continued rotation of the driving member 30 in the counterclockwise direction after the clutch assembly 24 has been operated to the disengaged condition of FIG. 6 could result in the driven member 32 being jammed against an inner surface 116 of the driving member 30. However, the slidable coupling assembly 46 cooperates with the threaded coupling assembly 94 to prevent either disconnection or jamming of the threaded coupling 94. To this end, the slidable coupling assembly 46 operatively disconnects the output member 40 from the driven member 32 upon a predetermined amount of axial movement of the driven member 32 relative to the driving member 30.

To enable the output member 40 to be operatively disconnected from the driving member 30, the slidable coupling assembly 46 includes a plurality of radially extending teeth 120 on the output member 40 which slidable engage mating slots 122 in the driven member (See FIGS. 2—6). When the driven member 32 is moved a predetermined axial distance relative to the driving member 30, the teeth 120 will no longer engage the slots 122. This effectively disconnects the driven member from the output member to thereby permit the driven member to rotate with the driving member free of the output member.

Accordingly, when the driving member 30 is driven in a clockwise direction and the clutch assembly 24 is operated from the engaged condition of FIGS. 2 and 3 toward the disengaged condition of FIG. 5, the threaded coupling 94 moves the driven member 32 axially outwardly relative to the driving member 30. This outward movement of the driving member is normally stopped, as a result of operation of the switch assembly 80, when the slots 122 are in the relationship shown in FIG. 5 relative to the teeth 120. However, if for some reason the clockwise relative rotation of the driving member 30 is continued, rather than being stopped by the operation of the switch assembly, the continued axial movement of the driving member under the influence of the threaded coupling 94 moves the slots 122 out of engagement with the teeth 120 before the threads 98 are disengaged from the threads 100. As soon as the slots 122 are moved out of engagement with the teeth 120, the load on the driven member 32 is effectively discontinued to permit the driven member 32 to rotate with the driving member 30 and to prevent the threaded coupling 94 from being disengaged.

Similarly, when the driving member 30 is rotated in a counterclockwise direction and the clutch assembly is disengaged, the driven member 32 is moved inwardly relative to the driving member 30. This causes the slots 122 in the driven member 32 to move into the relationship illustrated in FIG. 6 relative to the teeth 120. Continued counterclockwise rotation of the driving member 30 results in the teeth 120 of the connector member 38 being disengaged from the slots 122 before an innermost end portion 126 of the driven member moves into engagement with the surface 116 of the driving member 30. Of course, the relative positions of the driving and driven members 30 and 32 and the working relationship between the cross-slide assembly 16 and the turret and spindle assemblies 14 and 20 can be adjusted while the teeth 120 are disengaged from the slots 122.

As soon as the driving and driven members 30 and 32 are returned to their initial relationship after disengagement of the clutch assembly 24, the rollers 62 and 64 are automatically moved into engagement with the recesses 68 and 70 by the spring assemblies 74 and 76. By effecting an automatic reengagement of the clutch assembly 24, the spring assemblies 74 and 76 eliminate any necessity for manual actuation of the clutch assembly 24 to the engaged condition. To this end, the spring assembly 76 includes a spring 130 (See FIGS. 2, 4 and 7) which are mounted in a coaxial relationship with a guide shaft 134 between a reaction block 136 and a retaining washer or member 138. To enable the spring assembly 74 to be pivoted by movement of the arm 54 from the engaged condition of FIG. 2 to the disengaged condition of FIG. 4, the reaction block 136 is pivotally mounted at 140 (FIG. 7) on the driving member 30. The spring assembly 76 is constructed in a manner similar to the spring assembly 74.

In view of the foregoing description, it will be apparent that the clutch assembly 24 is operative to both protect the cross-slide assembly 16 against overloading and to maintain the cross-slide assembly in a predetermined working relationship with the spindle assembly 20 and turret assembly 14. To these ends, the clutch assembly 24 is operated from the engaged condition of FIGS. 2 and 3 to the disengaged condition of FIGS. 4—6 in response to the presence of an overload on the cross-slide assembly 16. Upon operation of the clutch assembly to the disengaged condition, relative rotation occurs between the driving and driven members 30 and 32. This relative rotation between the driving and driven members results in the cross-slide assembly 16 being moved out of the predetermined working relationship with the spindle assembly 20 and turret assembly 14.

After the overload condition on the cross-slide assembly 16 has been corrected, the cross-slide assembly 16 is returned to the predetermined working relationship with the turret and spindle assemblies 14 and 20. This is accomplished by either jogging the reversible motor 26 or by manually moving the cross-slide 16 relative to the workpiece 18, to thereby reverse the previous relative rotation between the driving and driven members 30 and 32. When the driving and driven members 30 and 32 are returned to the predetermined initial position relative to each other, that is, when any effective relative rotation or angular displacement between the driving and driven members has been eliminated, the clutch assembly 24 is operated to the engaged condition by the spring assemblies 74 and 76.

The threaded coupling 94 moves the driven member 32 axially relative to the driving member 30 whenever relative rotation occurs between the driving and driven members. The axial movement between the driving and driven members prevents the clutch assembly from being reengaged when the recesses 68 and 70 are radially aligned with the rollers 62 and 64 by half and/or full revolutions of relative rotation between the driving and driven members. This is because the rollers 62 and 64 engage one of the blocking surfaces 104 or 110 whenever the driving member 30 is angularly displaced relative to the driven member 32 by effective relative rotation between the driving and driven members.

It should be noted that, while only clutch assembly 24 has been illustrated in detail herein, the same description applies to clutch assembly 24a. Furthermore, it is contemplated that the described clutch assembly will be used in different environments from the illustrated machine tool 12. In addition, it should be understood that various modifications can be made from the illustrated embodiment of the clutch assembly. For example, the operational relationship of the driving and driven members 30 and 32 could, in certain environments, be reversed.

Therefore, having described only a preferred embodiment of my invention,

I claim:

1. An apparatus comprising first and second assemblies adapted to be driven in a predetermined relationship with each other, a drive train for operatively connecting said first and second assemblies to a source of power, clutch means in said drive train for driving one of said assemblies, said clutch means having an engaged condition in which said first and second assemblies are driven in a predetermined relationship relative to each other and a disengaged condition in which said first and second assemblies are movable out of the predetermined relationship with each other, said clutch means having drive-transmitting means operable from the engaged condition to the disengaged condition in response to an overload condition encountered by one of said assemblies and operable from the disengaged condition to the engaged condition only when said assemblies are in said predetermined relationship relative to each other.

2. An apparatus as set forth in claim 1 wherein said first and second assemblies are adapted to support tools for performing machining operations on the same workpiece when said assemblies are in the predetermined relationship relative to each other.

3. An apparatus as set forth in claim 1 wherein said clutch means includes driving and driven members drivingly connected by said drive transmitting means, one of said members being rotatable relative to the other member from an operating position corresponding to the predetermined relationship between said assemblies upon disengagement of said drive-transmitting means, said drive-transmitting means being reengageable only when there is zero effective relative rotation between said members to thereby provide for operation of said clutch means from the disengaged condition to the engaged condition only when said assemblies are in the predetermined relationship relative to each other.

4. Apparatus as set forth in claim 1 further including switch means for interrupting the transmission of power to said drive train from the source of power upon operation of said clutch means to the disengaged condition.

5. An apparatus comprising first and second assemblies adapted to be driven in a predetermined relationship with each other, a drive train for operatively connecting said first and second assemblies to a source of power, clutch means in said drive train for driving one of said assemblies, said clutch means having an engaged condition in which said first and second assemblies are driven in a predetermined relationship relative to each other and a disengaged condition in which said first and second assemblies are movable out of the predetermined relationship with each other, said clutch means having drive-transmitting means operable from the engaged condition in response to an overload condition encountered by one of said assemblies and operable from the disengaged condition to the engaged condition only when said assemblies are in said predetermined relationship relative to each other, said clutch means including driving and driven members, said drive-transmitting means including at least one arm mounted on one of said members and having a drive-transmitting member thereon engaging the other member when the clutch means is in the engaged condition, said arm being movable to move said drive-transmitting member out of driving engagement with said other member upon operation of said clutch means to the disengaged condition, and coupling means for providing relative movement between said members to prevent said arm from drivingly engaging said other member when said assemblies are in a relationship other than the predetermined relationship.

6. An apparatus as set forth in claim 5 further including spring means for urging said arm into driving engagement with said other member when said assemblies are in the predetermined relationship relative to each other.

7. An apparatus as set forth in claim 5 wherein said coupling means comprises a threaded connection between said driving and driven members providing relative axial movement therebetween upon relative rotational movement therebetween.

8. An apparatus for drivingly connecting an assembly with a source of power, said apparatus comprising rotatable driving and driven members, drive-transmitting means operable between an engaged condition in which said driving and driven members are drivingly connected in an initial angular relationship and a disengaged condition in which said driving and driven members are rotatable relative to each other, means for biasing said drive-transmitting means toward the engaged condition, said drive-transmitting means being operable to the disengaged condition upon encountering of an overload condition by said driven member, and means for enabling said drive-transmitting means to be operated from the disengaged condition to the engaged condition under the influence of said biasing means only when there is zero relative angular displacement of said members from their initial angular relationship.

9. An apparatus as set forth in claim 8 wherein said means for enabling said drive-transmitting means to be operated only when there has been zero relative angular displacement of said members from their initial angular relationship includes coupling means for effecting linear movement between said members in response to relative angular displacement of said members from their initial angular relationship.

10. An apparatus for drivingly connecting a driven assembly with a source of power, said apparatus comprising a rotatable driving member adapted to be driven by the source of power, a rotatable driven member adapted to be drivingly connected with the driving member, connector means operable between a disengaged condition and an engaged condition in which said driving member is drivingly connected to said driven member, said driving and driven members being retained against relative rotation from an initial relationship by said connector means when said connector means is in the engaged condition, said driving and driven members being rotatable relative to each other when said connector means is in the disengaged condition, said connector means being operable to the disengaged condition against the influence of a biasing means by the application of a load in excess of a normal operating load to said driven member, and means for preventing operation of said connector means from the disengaged condition to the engaged condition when there has been any effective relative rotation between said members from their initial relationship.

11. An apparatus for drivingly connecting a driven assembly with a source of power, said apparatus comprising a rotatable driving member adapted to be driven by the source of power, a rotatable driven member adapted to be drivingly connected with the driving member, connector means operable between a disengaged condition and an engaged condition in which said driving member is drivingly connected to said driven member, said driving and driven members being retained against relative rotation from an initial relationship by said connector means when said connector means is in the engaged condition, said driving and driven members being rotatable relative to each other when said connector means is in the disengaged condition, said connector means being operable to the disengaged condition against the influence of said biasing means by the application of a load in excess of a normal operating load to said driven member, means for preventing operation of said connector means from the disengaged condition to the engaged condition when there has been any effective relative rotation between said members from their initial relationship, and a coupling member for connecting said driven member with the driven assembly, said coupling and driven members being axially movable relative to each other between a first condition in which said driven member is connected to the coupling member and a second condition in which said driven member is disconnected from the coupling member to thereby enable said initial relationship between said driving and driven members to be adjusted.

12. An apparatus as set forth in claim 11 further including threaded coupling means for effecting relative movement between said driven member and said coupling member to move them from the first condition to the second condition in response to a predetermined amount of relative rotation between said driving and driven members in the disengaged condition.

13. An apparatus as set forth in claim 12 wherein relative movement between said coupling member and said driven member in either of two axially opposite directions is effective to move them from the first condition to the second condition and said threaded coupling means is operative to effect relative movement between said coupling member and said driven member in either of the two axially opposite directions depending upon the direction in which said driving and driven members are rotated.

14. An apparatus comprising a first assembly adapted to support a tool for operating on a workpiece, a second assembly for use in association with said first assembly while an operation is being performed on the workpiece, a drive train for operatively connecting said first and second assemblies to a source of power and for driving said first and second assemblies in a predetermined relationship with each other, clutch means mounted in said drive train and operable from an engaged condition in which said assemblies are driven in the predetermined relationship with each other to a disengaged condition in which said assemblies are movable out of the predetermined relationship with each other in response to an overloading of one of said assemblies, said clutch means including rotatable driving and driven members, connector means mounted one on one of said members and movable between a first position in which said members are drivingly interconnected in an initial angular relationship with each other and corresponding to the engaged condition of said clutch means and a second position in which said members are rotatable relative to each other and corresponding to the disengaged condition of said clutch means, and means for enabling movement of said connector means from the second position to the first position only when said members are in their initial angular relationship and there has been zero effective relative rotation between said members from their initial angular relationship to thereby prevent operation of said clutch means from the disengaged condition to the engaged condition when said assemblies are in a relationship other than the predetermined relationship, and means adapted to be operated by said clutch means when said clutch means is in the disengaged condition for stopping the transmission of power from the source of power to the drive train.

15. An apparatus as set forth in claim 14 wherein said means for enabling movement of said connector means from the second position to the first position includes means for providing axial movement between said driving and driven members in response to relative rotation between said members.

16. An apparatus as set forth in claim 15 wherein said clutch means further includes coupling means for operatively disconnecting said clutch means from said assemblies in response to a predetermined amount of effective axial movement between said driving and driven members.

17. An apparatus for drivingly connecting an assembly with a source of power, said apparatus comprising rotatable driving and driven members, drive-transmitting means operable between an engaged condition in which said driving and driven members are drivingly connected in an initial angular relationship and a disengaged condition in which said driving and driven members are rotatable relative to each other, means for biasing said drive-transmitting means toward the engaged condition and being operable to the disengaged condition upon encountering of an overload condition by said driven member, said drive-transmitting means comprising an arm member pivotally connected to one of said members and extending transverse to the axis of rotation thereof, and a pair of roller members supported on said arm member and located on opposite axial sides thereof and engageable in a driving recess in the other of said members, and means for enabling said drive-transmitting means to be operated from the disengaged condition to the engaged condition under the influence of said biasing means only when there is zero relative angular displacement of said members from their initial angular relationship, and including coupling means for effecting linear relative movement between said members in response to relative angular displacement of said members from their initial angular relationship.

18. An apparatus as defined in claim 17 wherein each of said rollers engages a respective surface portion of said other member upon relative movement of said members in respective opposite directions.

19. An apparatus comprising first and second assemblies adapted to be driven in a predetermined relationship with each other, said first and second assemblies being adapted to support tools for performing machining operations on the same workpiece when said assemblies are in the predetermined relationship relative to each other, a drive train for operatively connecting said first and second assemblies to a source of power, clutch means in said drive train for driving one of said assemblies, said clutch means having an engaged condition in which said first and second assemblies are driven in a predetermined relationship relative to each other and a disengaged condition in which said first and second assemblies are movable out of the predetermined relationship with each other, said clutch means having drive-transmitting means operable from the engaged condition to the disengaged condition in response to an overload condition encountered by one of said assemblies and operable from the disengaged condition to the engaged condition only when said assemblies are in said predetermined relationship relative to each other, said clutch means including driving and driven members drivingly connected by said drive-transmitting means, one of said members being rotatable relative to the other member from an operating position corresponding to the predetermined relationship between said assemblies upon disengagement of said drive-transmitting means, said drive-transmitting means being reengageable only when there is zero effective relative rotation between said members to thereby provide for operation of said clutch means from the disengaged condition to the engaged condition only when said assemblies are in the predetermined relationship relative to each other, said clutch means further including coupling means for effecting axial movement of one of said driving and driven members relative to the other of said driving and driven members upon relative rotation between said members to thereby position said members relative to each other to block operation of said drive-transmitting means from said disengaged condition to said engaged condition.

20. An apparatus comprising first and second assemblies adapted to be driven in a predetermined relationship with each other, a drive train for operatively connecting said first and second assemblies to a source of power, clutch means in said drive train for driving one of said assemblies, said clutch means having an engaged condition in which said first and second assemblies are driven in a predetermined relationship relative to each other and a disengaged condition in which said first and second assemblies are movable out of the predetermined relationship with each other, said clutch means having drive-transmitting means operable from the engaged condition to the disengaged condition in response to an overload condition encountered by one of said assemblies and operable from the disengaged condition to the engaged condition only when said assemblies are in said predetermined relationship relative to each other, and means for operatively disconnecting said clutch means from one of said assemblies by interrupting said drive train in response to the transmission of power from a power source to said clutch means when said clutch means is in the disengaged condition.

21. An apparatus for drivingly connecting an assembly with a source of power, said apparatus comprising rotatable driving and driven members, drive-transmitting means operable between an engaged condition in which said driving and driven members are drivingly connected in an initial angular relationship and a disengaged condition in which said driving and driven members are rotatable relative to each other, means for biasing said drive-transmitting means toward the engaged condition, said drive-transmitting means being operable to the disengaged condition upon encountering of an overload condition by said driven member, and means for enabling said drive-transmitting means to be operated from the disengaged condition to the engaged condition under the influence of said biasing means only when there is zero relative angular displacement of said members from their initial angular relationship, said means for enabling said drive-transmitting means to be operated only when there has been zero relative angular displacement of said members from their initial angular relationship includes coupling means having a threaded connection between said driving and driven members for effecting linear movement between said members in response to relative angular displacement of said members from their initial angular relationship.

22. Apparatus for drivingly connecting an assembly with a source of power, said apparatus comprising a rotatable driving shaft operatively connected with the source of power, a rotatable driven shaft operatively connected with the assembly, clutch means having a rotatable driving member operatively connected with said driving shaft and a rotatable driven member operatively connected with said driven shaft, said clutch means being operable between an engaged condition in which said driving member is operable to transmit rotational movement from said driving shaft to said driven member to thereby drive the assembly and a disengaged condition in which said driving member is rotatable relative to said driven member and is ineffective to transmit rotational movement from said driving shaft to said driven shaft, and means for operatively disconnecting one of said members from the associated one of said shafts in response to rotation of said driving shaft with said clutch means in the disengaged condition so that said driving and driven members are rotatable together relative to said one shaft with said clutch means in the disengaged condition.

23. An apparatus comprising first and second assemblies adapted to be driven in a predetermined relationship with each other, a drive train for operatively connecting said first and second assemblies to a source of power, clutch means having driving and driven members in said drive train for driving one of said assemblies, said clutch means having an engaged condition in which said driving and driven members are retained against rotation relative to each other and said first and second assemblies are driven in a predetermined relationship relative to each other and a disengaged condition in which said driving and driven members are rotatable relative to each other and said first and second assemblies are movable out of the predetermined relationship with each other upon relative rotation between said members, and means for enabling said clutch means to be operated from the disengaged condition to the engaged condition only when there has been zero effective relative rotation between said members during disengagement of said clutch means to prevent said clutch means from being operated to the engaged condition when said assemblies are in a relationship with each other which is different from said predetermined relationship.